W. B. GERVAIS.
FIRE DOOR.
APPLICATION FILED MAR. 7, 1914.
1,260,182.
Patented Mar. 19, 1918.
4 SHEETS—SHEET 1.
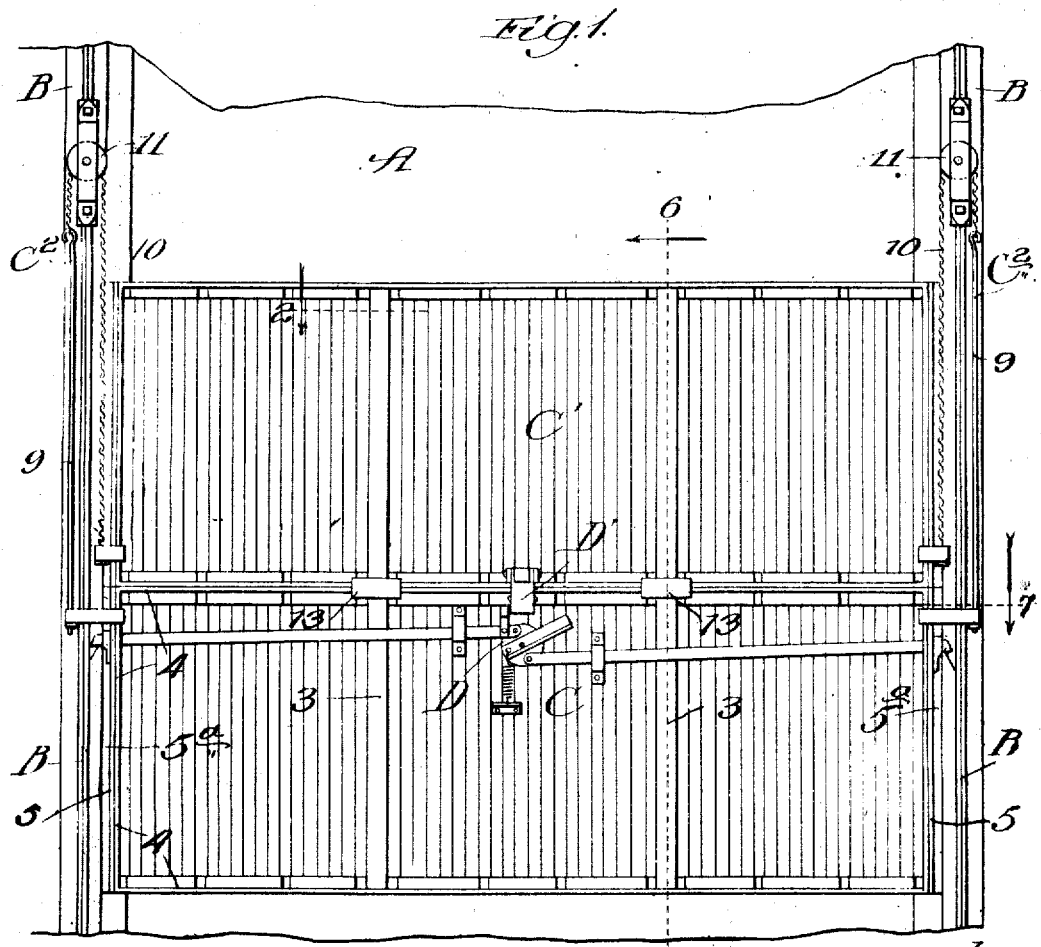
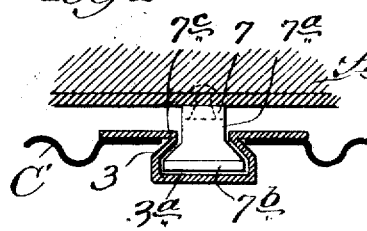
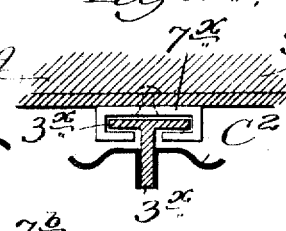
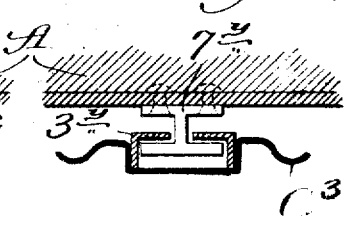
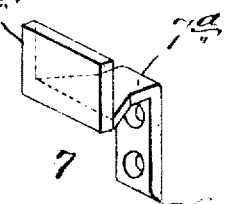
Witnesses:
Inventor:
Wainwright B. Gervais

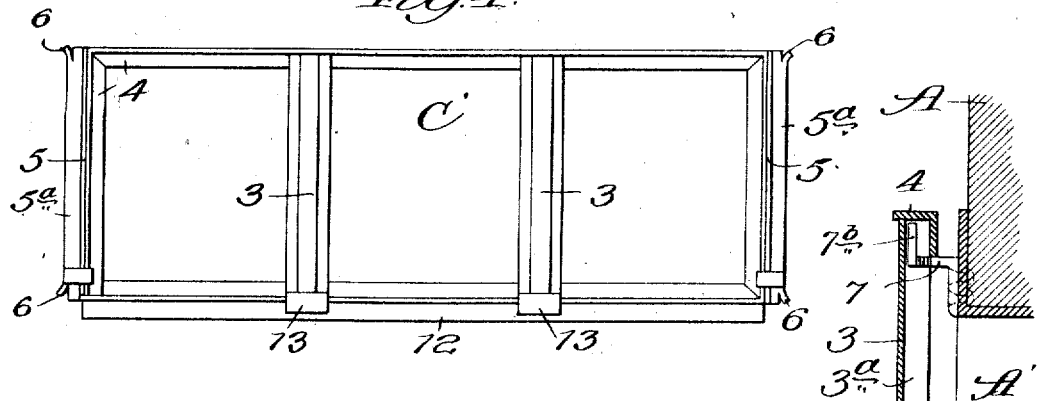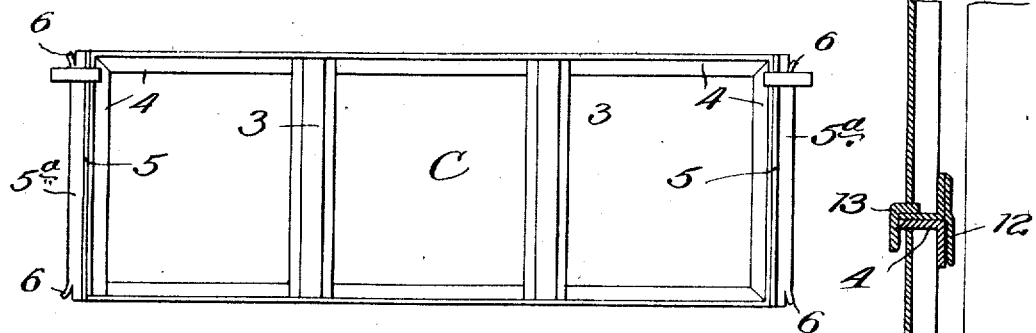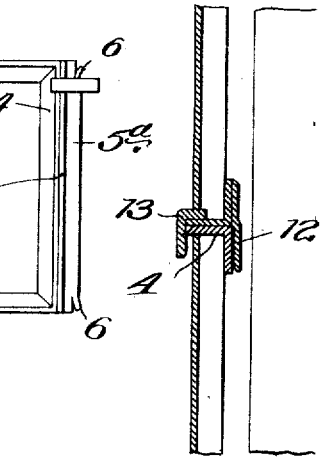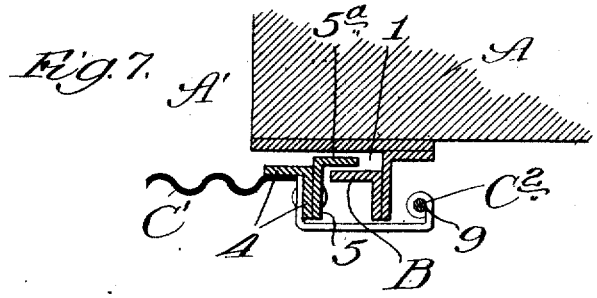

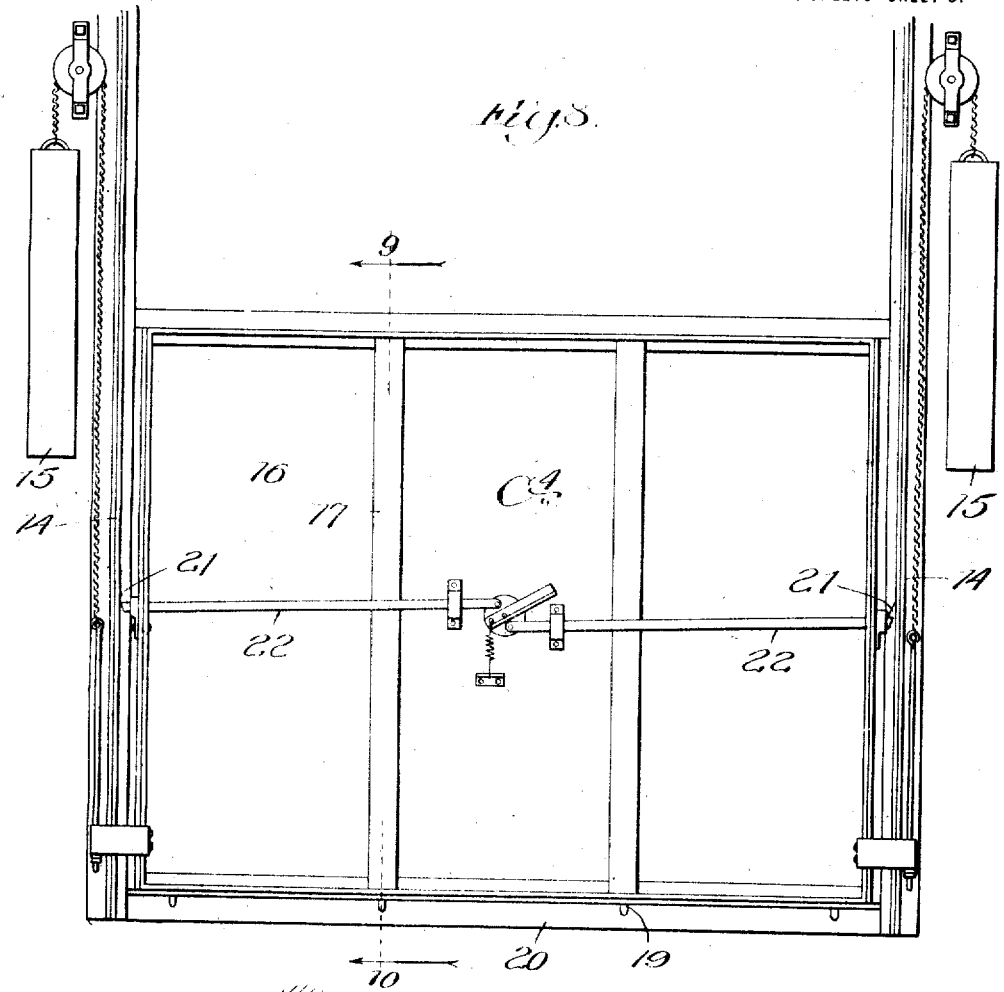

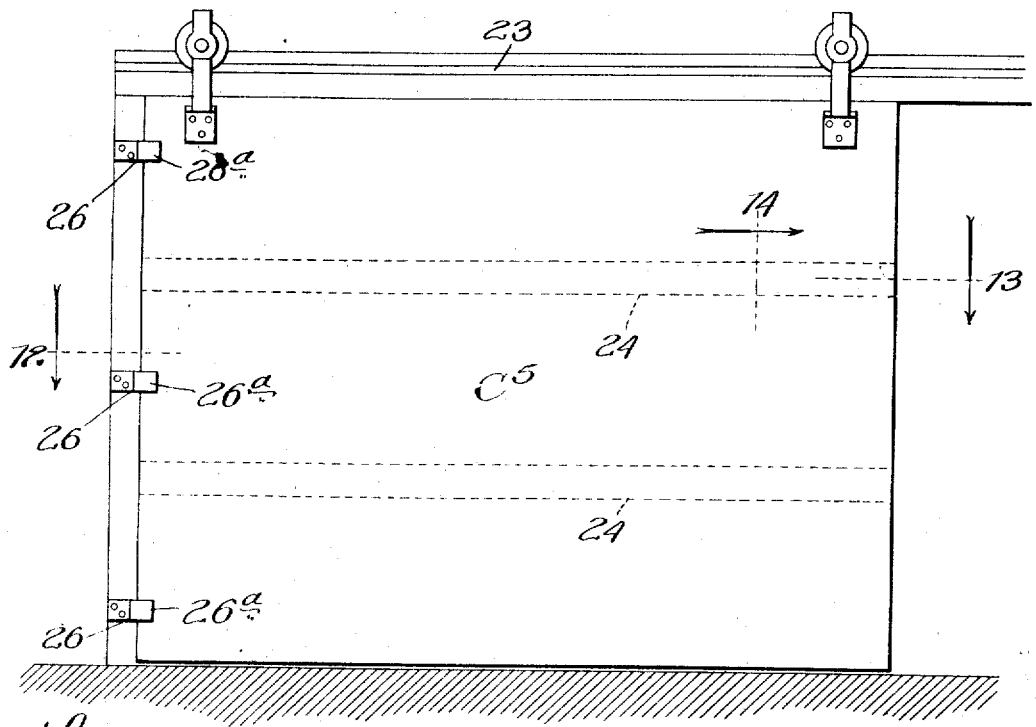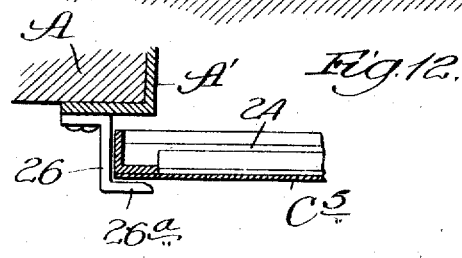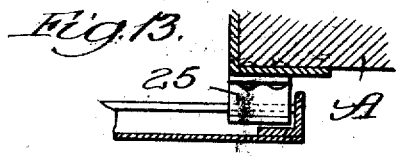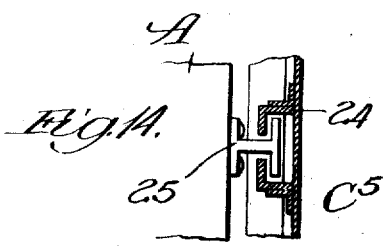

UNITED STATES PATENT OFFICE.

WAINWRIGHT B. GERVAIS, OF CHICAGO, ILLINOIS, ASSIGNOR TO VARIETY MANUFACTURING COMPANY, OF CHICAGO, ILLINOIS, A CORPORATION OF ILLINOIS.

FIRE-DOOR.

1,260,182.

Specification of Letters Patent.

Patented Mar. 19, 1918.

Application filed March 7, 1914. Serial No. 823,210.

*To all whom it may concern:*

Be it known that I, WAINWRIGHT B. GERVAIS, a citizen of the United States, residing at Chicago, in the county of Cook and State of Illinois, have invented a new and useful Improvement in Fire-Doors, of which the following is a specification.

This invention relates particularly to fire-doors which are adapted for use more especially as elevator-doors for the shafts of freight elevators, althought the invention is not limited to this particular use.

The primary object of the invention is to provide a door of improved construction and operation, having special provisions to afford greater security against fire and greater durability of the door.

The invention is illustrated in the preferred embodiment in the accompanying drawings, in which—

Figure 1 represents an inner broken elevational view of the wall of an elevator-shaft, equipped with my improved door; Fig. 2, a broken horizontal sectional view taken as indicated at line 2 of Fig. 1 and showing a continuously interlocked guide-device employed for maintaining the intermediate portions of the door-sections in close engagement with the wall; Fig. 2ª and Fig. 2ᵇ, similar sectional views showing modified forms of guide-devices; Fig. 3, a perspective view of the combination guide-member and stop shown in Fig. 2; Fig. 4, an elevational view of the upper door-section; Fig. 5, an elevational view of the lower door-section; Fig. 6, a vertical sectional view taken as indicated at line 6 of Fig. 1; Fig. 7, a broken horizontal section taken as indicated at line 7 of Fig. 1; Fig. 8, a view similar to Fig. 1, but showing the door in one section only; Figs. 9 and 10, broken detail sectional views at the top and bottom, respectively, taken as indicated at the corresponding lines of Fig. 8; Fig. 11, a view showing the invention applied to a horizontally-sliding door; and Figs. 12, 13, and 14, broken sectional views taken as indicated at the corresponding lines of Fig. 11.

In the construction illustrated, A represents the wall of an elevator-shaft having a door-opening A'; B, B, vertical guides connected with the inner surface of the wall A and extending along the lateral margins of the door-opening; C, C', lower and upper door-sections, respectively, movable in the guides B, B, said lower and upper door-sections being joined by flexible connections C², whereby said door-sections serve to counter-balance each other in a well understood manner; D, latching mechanism connected with the lower door-section; and D', a central latch coöperating with the latching mechanism D.

The construction of the wall A may be, of any approved type. The guides B may be of any suitable construction. As shown in Fig. 7, each guide B is formed to afford between it and the wall a space or guide-channel 1, which receives the lateral guide-flanges of the door-sections.

In the illustration given in Figs. 1, 2, 4, 5 and 6, each door-section is formed of vertically corrugated metal plates 2, the vertical adjacent edge-portions of which are secured to flanged channel-members 3, and the outer marginal portions of which are bound by an angle-bar 4. The lateral edge-portions of each door-section have connected therewith angle-bars 5 wh...h have out-turned flanges 5ª adapted to move in the spaces or channels 1 of the lateral guides B, as will be clearly understood from Fig. 7. The flanges 5ª are split at their upper and lower ends in the illustration given, and the several portions are bent outwardly to afford bearings 6.

The flanged channel-bars 3 serve both as stiffening or reinforcing members for the door-section, and also afford vertical grooves, or channels, 3ª, as shown in Figs. 2 and 6, which are adapted to accommodate upper and lower binding members, or binding guide-members 7 and 8, respectively, which continuously project into said channels, when the door-sections are moved in opening or closing the same. In the form illustrated in Figs. 1, 2 and 6, the member 7 has a reduced shank-portion 7ª and an enlarged hook-portion 7ᵇ; and the corresponding journal-bar 3 has its base-portion contracted or made of dovetail form, as indicated at 7ᶜ, so that as the door-section moves with respect to the member 7, it will be continuously bound or held to the wall. The upturned hook-portion 7ᵇ is adapted to interlock with the upper binding member or angle-bar 4 when the door-section is in its lowered position, as indicated in Fig. 6. Similarly, the lower member 8 has a contracted shank-portion 8ª and an enlarged downturned hook-portion 8ᵇ which moves in the dovetailed groove 3ᵃ, the member 8 engaging the lower angle-bar 4 when the lower door-section C is in the elevated position.

From the foregoing, it will be understood that the intermediate portions of the door-sections are bound or held to the wall, regardless of whether the door-sections are moving, or are disposed in either the opened or closed position.

The connections C² comprise rods 9 connected with the upper corners of the lower door-section; chains 10 connected with the upper ends of said rods and with the lower corners of the upper door-section, and wheels 11 carried by the guides B and over which the chains pass. Thus, the door-sections are adapted to counter-balance each other in a well-understood manner.

The latch mechanism D is adapted to support the lower door-section on the guides B; and the central latch device D' is adapted to lock the door-sections together, the latch-device D' being released in the operation of releasing the latch mechanism D. No claims for the latch mechanism are presented in this application.

The lower portion of the upper door-section is equipped with an astragal 12, which affords a flange which embraces the outer surface of the upper binding member 4 of the lower door-section in the manner shown in Fig. 6; and the upper door-section is also equipped at the lower ends of the channel-members 3 with angular members 13 which embrace the upper member 4 of the lower door-section as shown in Fig. 6. Thus, when the door-sections are together, a protected joint is afforded; and, as above indicated, the door-sections are bound to the wall above and below. the door-opening by the binding guide-members 7 and 8, which permit the door-sections to be readily opened and closed, to bind them at intermediate points to the wall, while permitting the sliding action.

Fig. 2ᵃ shows a reversal of the parts shown in Fig. 2, as well as a modified structure of the parts. In this construction, 7ˣ represents the stationarily-mounted guide-member corresponding with the guide-member 7; and 3ˣ represents an intermediate guide-member carried by the door-section C². Here, the door-carried guide-member 3ˣ is of T-form, and the head of the T engages a T-slot in the stationarily-mounted guide-member 7ˣ.

In Fig. 2ᵇ, the door-section C³ is equipped with a guide-member 3ʸ which affords a T-slot; and the stationarily-mounted guide-member 7ʸ has a shank and head of T-form, having slidable interlocking engagement with the guide-member 3ʸ.

In each case, the door-section is preferably composed of corrugated sheet-metal plates connected with the intermediate vertical guide-members with which the door-sections are equipped.

In each case, also, the sliding interlocking connection is maintained between the door-carried guide-members and the stationary guide-members at all times, so that there is no possibility of their ever becoming disengaged.

From the description given, it will be understood that the improved door affords great security against fire, and is strong and durable; buckling of the door, or bowing of the same away from the wall is effectually prevented, and any gapping, which might possibly permit the passage of flames in time of fire, is obviated.

In the construction illustrated in Figs. 8-10, the door C⁴ is a vertically-slidable door movable in lateral guides 14 adapted to be lifted by counter-weights 15. The door C⁴ is virtually of integral construction, and is preferably formed of corrugated sheet-metal plates 16 connected by vertical channel-plates, or guides, 17. The intermediate members, or guides, 17 extend from the top to the bottom of the door and are engaged by binding guide-members 18 which are stationarily mounted above the door-opening A', in the manner shown in Fig. 9. The guide-members 18 are similar to the guide-members 7 and engage the guides 17 in the same manner that the guides 7 engage the guides 3, as shown in Fig. 2. The door C⁴ is preferably provided at its lower end with pins 19 which engage sockets in the angle 20 which provides a marginal member at the bottom of the door-opening, in the manner shown in Fig. 10.

The guides 14 are equipped with stops 21 engaged by latch-bars 22, which serve to hold the door in a closed position against the force exerted by the counter-weights 15.

In the construction shown in Figs. 11-14, the door C⁵ is virtually of integral construction and is supported from a horizontally-disposed track 23 disposed above the door-opening. In this case, the horizontally-movable door is provided with horizontal intermediate guide-members 24, which are continuously engaged by stationary guide-members 25 mounted on the wall A at one side of the door-opening A', as is shown in Figs. 13 and 14. The guides 24 are similar to the guides 3ʸ shown in Fig. 2ᵇ, while the stationary guides 25 are similar to the guides 7ʸ shown in Fig. 2ᵇ.

At the opposite vertical edge of the door, the wall is equipped with stops 26 having projections 26ᵃ adapted to embrace the outer margin of the door, in the manner shown in Fig. 11.

In each construction, the intermediate guides of the door are continuously engaged by stationary guide-members while the door is being opened and closed, and while the door is in the opened or closed position.

It may be mentioned that by means of the continuous binding or interlocking-engagement between the binders and guide-members three distinct advantages are gained: First, if the door should be struck by a heavy truck when partially open, it will not be bent, distorted, or dislodged from its mounting; second, when the door is fully opened, it will still be securely bound to the wall, so that injury cannot result from trucking operations; third, if the door be almost closed, but not latched, the binders will hold it close to the wall and prevent passage of flame, the astragal 12 serving at the same time to prevent passage of the flame at the meeting edges of the door-sections; fourth, in the horizontally divided door, when the upper angle of the lower section is at the bottom of the door-opening, the downturned hook 8$^b$ will not engage the vertical flange of the member 4, but the door will nevertheless be bound close to the wall by reason of the continuous interlocking sliding engagement employed; fifth, the continuous interlocking engagement between the binders and the intermediate guide members tends to prevent racking of the door in its own plane, and thus to prevent "sticking" of the door at the lateral edge guides.

The foregoing detailed description has been given for clearness of understanding only, and no unnecessary limitation should be understood therefrom, but the appended claims should be construed as broadly as permissible.

What I regard as new and desire to secure by Letters Patent is—

1. In a door of the character set forth, the combination of a pair of lateral guides, a pair of door-sections vertically slidable therein, each door-section provided with an intermediate vertical guide-clip, a guide-member carried by the wall above the door-opening and having continuous interlocking slidable engagement with the intermediate guide-member of the upper door-section, and a guide-clip carried by the wall below the door-opening and having continuous slidable interlocking engagement with the intermediate guide-member of the lower door-section.

2. In a door of the character set forth, the combination of a wall provided with a door-opening, and equipped above and below said door-opening with a pair of guide-clips and equipped also with lateral vertical guides flanking said door-opening, of a pair of door-sections slidable in said lateral guides, each door-section having an intermediate vertical guide-member, the guide-members of the door-sections being in continuous slidable binding engagement with said guide-clips.

3. In a door of the character set forth, the combination of a wall provided with a door-opening and equipped above an intermediate portion of said door-opening with a guide-clip and equipped also with lateral vertical guides flanking said door-opening and extending above the same, a door-section vertically slidable in said lateral guides and having an intermediate vertical channel-member forming a part of the door and affording a guide-groove having a contracted slot-like opening, and a guide-clip secured to the wall above said opening and having a head-portion confined in the guide-groove of said channel-member, whereby continuous binding engagement between the door-section and the lintel is maintained.

4. In a door of the character set forth, the combination with a wall provided with a door-opening and equipped above and below said door-opening with a pair of guide-clips and equipped also with vertical lateral guides flanking said door-opening, a pair of door-sections movable in said lateral guides, each comprising corrugated sheet-metal plates, channel members secured to said plates at their meeting edges and having contracted openings, said guide-clips having shanks extending through said openings and having head-portions interlockingly engaging the guide-members of the door-sections, and perimetral binding members at the upper portion of the upper door-section and the lower portion of the lower door-section adapted to be engaged by said guide-clips when the door-sections are in closed position.

5. The combination with two door sections mounted to slide vertically from and toward each other in the same vertical plane, one section being adapted to move to the sill of the door opening to be closed by said doors, and the other to move to the lintel of said opening, of a recessed shoe attached to the lintel of the door opening, a guide member on the upper door section extending from the upper edge to the lower edge of the same and fitting said shoe, a recessed shoe secured directly below the sill of the door opening, a guide member attached to the lower door section and extending from the upper to the lower edge of the same, which guide member is engaged by the last said shoe, all substantially as described whereby both door sections strengthened and stiffened between the side edges.

WAINWRIGHT B. GERVAIS.

In presence of—
MILLIARD GILMORE,
HERVEY ROY DAILEY.